United States Patent [19]

Yokogawa et al.

[11] Patent Number: 4,824,942
[45] Date of Patent: Apr. 25, 1989

[54] FIBER-REACTIVE MONOAZO COMPOUND AND AQUEOUS COMPOSITIONS THEREOF IMPARTING AND COLOR

[75] Inventors: Kazufumi Yokogawa, Minoo; Noriaki Yamauchi, Hirakata; Takashi Omura, Ashiya, all of Japan

[73] Assignee: Sumitomo Chemical Company, Limited, Osaka, Japan

[21] Appl. No.: 147,119

[22] Filed: Jan. 21, 1988

Related U.S. Application Data

[63] Continuation of Ser. No. 19,254, Feb. 26, 1987, abandoned.

[30] Foreign Application Priority Data

Mar. 3, 1986 [JP] Japan .................................. 61-45663
Jul. 18, 1986 [JP] Japan ................................. 61-170484

[51] Int. Cl.⁴ ........................ C09B 62/51; D06P 1/38; D06P 3/24; D06P 3/66
[52] U.S. Cl. ........................................ 534/642; 8/549; 260/507 R; 534/581; 534/582
[58] Field of Search ............................. 534/642; 8/549

[56] References Cited

U.S. PATENT DOCUMENTS

| | | |
|---|---|---|
| 3,553,189 | 1/1971 | Sugiyama et al. .................. 534/642 |
| 4,046,754 | 9/1977 | Meininger et al. ................. 534/642 |
| 4,134,887 | 1/1979 | Fuchs et al. ......................... 534/642 |

FOREIGN PATENT DOCUMENTS

| | | | |
|---|---|---|---|
| 785284 | 5/1968 | Canada ................................. 534/642 |
| 0124797 | 11/1984 | European Pat. Off. ............ 534/642 |
| 1602436 | 12/1970 | France ................................. 534/642 |
| 46-4341 | 2/1971 | Japan .................................. 534/642 |
| 46-4462 | 2/1971 | Japan .................................. 534/642 |
| 46-37186 | 11/1971 | Japan .................................. 534/642 |
| 58-120672 | 7/1983 | Japan .................................. 534/638 |

OTHER PUBLICATIONS

41-Dyes, vol. 99, 1983, p. 77 (141529k) [*Corresponds to JP '672 cited above.] (BASF II).

*Primary Examiner*—Floyd D. Higel
*Attorney, Agent, or Firm*—Stevens, Davis, Miller & Mosher

[57] ABSTRACT

A monoazo compound represented by the following formula in a free acid form,

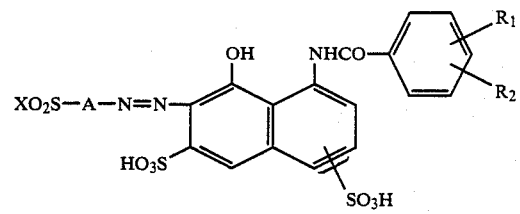

wherein A is phenylene unsubstituted or substituted with methyl, methoxy, chloro, carboxy or sulfo, or naphthylene unsubstituted or substituted with sulfo, $R_1$ and $R_2$ are independently hydrogen, chloro, methyl, nitro, carboxy or sulfo, excepting the case where both $R_1$ and $R_2$ are hydrogen, and X is $-CH=CH_2$ or $-CH_2CH_2Y$ in which Y is a splittable group by the action of an alkali, which is useful for dyeing or printing fiber materials in a deep red color, and an aqueous liquid product of which is stable chemically and physically, even when stored for a long period of time.

9 Claims, No Drawings

FIBER-REACTIVE MONOAZO COMPOUND AND AQUEOUS COMPOSITIONS THEREOF IMPARTING AND COLOR

This application is a continuation of application Ser. No. 019,254, filed Feb. 26, 1987, now abandoned.

The present invention relates to a monoazo compound, a process for producing the same, and a process for dyeing or printing fiber materials. More specifically, the present invention relates to a vinylsulfone type fiber-reactive monoazo compound having a benzoylamino-carrying coupler, which is useful for dyeing or printing hydroxyl or amide group-containing fiber materials, particularly such as cellulose fiber, natural or synthetic polyamide fiber, polyurethane fiber, leather and their mixed fiber, in a red color.

Fiber-reactive dyes, particularly vinylsulfone type fiber-reactive dyes have been widely used for dyeing or printing fiber materials such as cellulose and polyamides in various conventional dyeing or printing manners, because they can give dyed or printed products of brilliant color shade with an excellent wet fastness property.

In recent years, dyeing and printing systems in a dye house have been actively mechanized and automated in many aspects, and therefore the reactive dyes have been eagerly required to be formed into a form suitable for automatic weighing and dispensing systems.

An aqueous liquid dye composition is now considered to be very suitable therefor, unlike usual powder compositions, because it can be applied suitably for the automatic weighing and dispensing devices, and causes no powder-scattering on the handling, resulting in no pollution of a working environment, and moreover it can serve saving energy and labor.

In order to form the reactive dyes into the aqueous liquid composition, the reactive dyes are required to have a high solubility in water medium, in addition to excellent dyeing performances, and moreover their aqueous liquid compositions are required to be chemically and physically stable during a long-period storage.

However, known reactive dyes, particularly known vinylsulfone type reactive monoazo dyes of a red color are not yet sufficient and waiting for improvement regarding this matter.

The present inventors have undertaken extensive studies to find reactive dyes of this kind meeting needs described above, and found a specific monoazo compound which can exhibit excellent dyeing performances such as color yield, even dyeing property and various fastness properties and have a high water solubility and a high storage stability in an aqueous liquid state.

The present invention provides a monoazo compound represented by the following formula (I) in a free acid form,

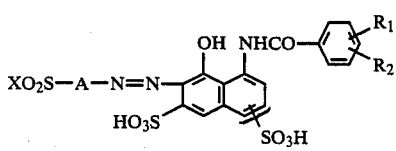

wherein A is phenylene unsubstituted or substituted with methyl, methoxy, chloro, carboxy or sulfo, or naphthylene unsubstituted or substitted with sulfo, $R_1$ and $R_2$ are independently hydrogen, chloro, methyl, nitro, carboxy or sulfo, excepting the case where both $R_1$ and $R_2$ are hydrogen, and X is —CH=CH$_2$ or —CH$_2$CH$_2$Y in which Y is a group splittable by the action of an alkali, and a process for producing the monoazo compound of the formula (I), which comprises subjecting a diazonium salt of an aromatic amine compound of the following formula (II), $$XO_2S-A-NH_2 \quad (II)$$

wherein A and X are as defined above, to coupling reaction with a naphthalene compound of the following formula (III) in a free acid form,

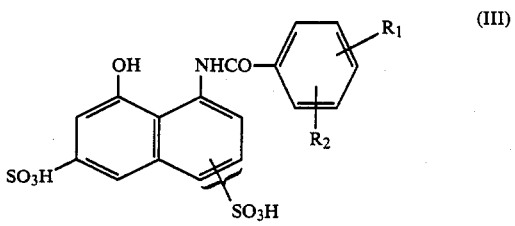

wherein $R_1$ and $R_2$ are as defined above.

The present invention also provides a process for dyeing or printing hydroxyl or amide group-containing fiber materials, which comprises using the monoazo compound of the formula (I).

Among the monoazo compounds of the formula (I) having the phenylene as A, particularly preferred are the following monoazo compounds represented by the following formula (I)-1 in a free acid form;

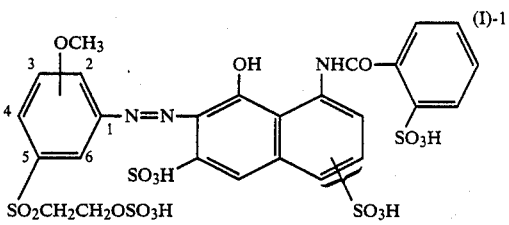

wherein the methoxy is located at 2- or 4-position, and among those having the naphthylene as A, preferred are those represented by the following formula (I)-2 in a free acid form,

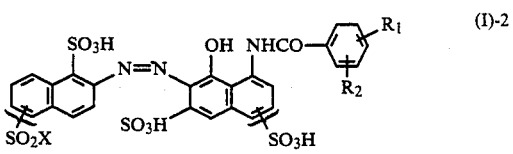

wherein $R_1$, $R_2$ and X are as defined above, more specifically by the following formulas (I)-3 and (I)-4 in each free acid form,

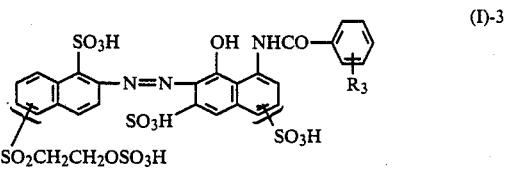

wherein $R_3$ is chloro, methyl, nitro, carboxy or sulfo,

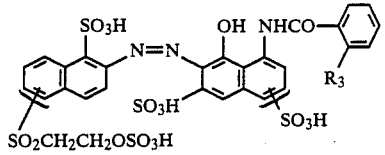
(I)-4 wherein R₃ is as defined above, much more specifically by the following formulas (I)-5 and (I)-6 in each free acid form,

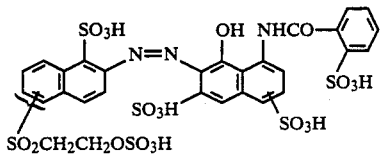
(I)-5

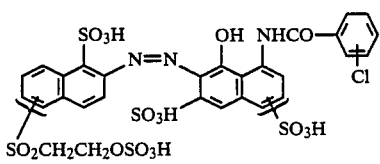
(I)-6 wherein the most preferred is the one having the chloro located at 2-position.

Examples of the group splittable represented by Y are sulfuric acid ester group, thiosulfuric acid ester group, phosphoric acid ester group, acetic acid ester group and the like, and preferred X includes —CH=CH₂ and —CH₂CH₂OSO₃H.

The monoazo compounds of the formula (I) may be in the form of a free acid or an alkali or alkaline earth metal salt. Of these, preferred are lithium, sodium or potassium salt, particularly when used for the dyeing or printing of fiber materials.

The monoazo compound of the formula (I) can be produced in any conventional manner, for example, by diazotizing the aromatic amine compound of the formula (II) in a conventional manner, and then coupling the resulting diazonium salt with the naphthalene compound of the formula (III) in a conventional manner.

The diazotization reaction can be carried out at a temperature ranging from 0° to 40° C. in the presence of a mineral acid using a small excess amount of sodium nitrite, and the coupling reaction can be carried out at a temperature ranging from 0° to 30° C. and at a pH within a range of 3 to 9 in an aqueous medium. In this coupling reaction, the diazonium salt may be added to the coupling component or vice versa.

The naphthalene compound of the formula (III) can be prepared in the following manner.

Benzoic acid chloride (IV) or anhydride (V),

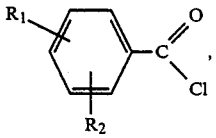
(IV)

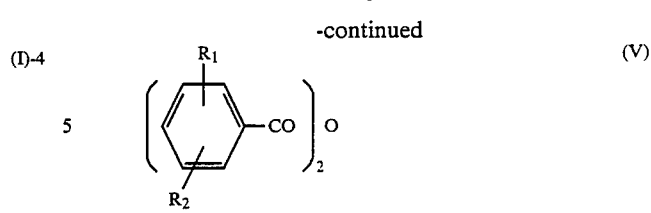
(V)

wherein R₁ and R₂ are as defined above, is added to a neutral aqueous solution of 1-amino-8-hydroxynaphthalene-3,6- or -4,6-disulfonic acid, and the mixture is subjected to reaction at a temperature ranging from 0° to 50° C., while controlling the pH within a range of 3 to 8, followed by hydrolysis of the O-acyl group at a temperature ranging from 40° to 100° C., while controlling the pH within a range of 8 to 10.

Examples of the aromatic amines of the formula (II) are 1-aminobenzene-2-, -3- or -4-β-sulfatoethylsulfone, 1-aminobenzene-3-β-phosphatoethylsulfone, 1-amino-4-methylbenzene-3-β-sulfatoethylsulfone, 1-aminobenzene-3-β-chloroethylsulfone, 1-amino-4-methoxybenzene-3-β-sulfatoethylsulfone, 1-aminobenzene-4-β-sulfatoethylsulfone-2-sulfonic acid, 1-aminobenzene-5-β-sulfatoethylsulfone-2-sulfonic acid, 1-aminobenzene-5-β-sulfatoethylsulfone-2,4-disulfonic acid, 1-amino-2,5-dimethoxybenzene-4-β-sulfatoethylsulfone, 1-aminobenzene-4-β-sulfatoethylsulfone-2-carboxylic acid, 1-aminobenzene-5-β-sulfatoethylsulfone-2-carboxylic acid, 1-amino-2-methoxybenzene-4-β-sulfatoethylsulfone, 1-amino-2-chlorobenzene-4-β-sulfatoethylsulfone, 1-amino-2-methoxybenzene-5-β-sulfatoethylsulfone, 2-amino-naphthalene-8-β-sulfatoethylsulfone, 2-aminonaphthalene-8-β-sulfatoethylsulfone-6-sulfonic acid, 1-amino-2,5-dimethoxybenzene-4-vinylsulfone, 1-amino-2-methoxy-5-methylbenzene-4-β-sulfatoethylsulfone, 1-aminobenzene-5-vinylsulfone-2,4-disulfonic acid, 1-aminobenzene-5-β-phosphatoethylsulfone-2,4-disulfonic acid, 1-aminobenzene-5-β-chloroethylsulfone-2,4-disulfonic acid, 2-aminonaphthalene-8-β-phosphatoethylsulfone-6-sulfonic acid, 2-aminonaphthalene-8-vinylsulfone-6-sulfonic acid, 1-amino-2-methoxy-5-methylbenzene-4-β-chloroethylsulfone, 1-aminobenzene-3- or -4-vinylsulfone, 1-aminobenzene-5-vinylsulfone-2-sulfonic acid, 2-aminonaphthalene-5- or -6-β-sulfatoethylsulfone-1-sulfonic acid, 2-aminonaphthalene-5- or -6-vinylsulfone-1-sulfonic acid, 1-aminobenzene-2-, -3- or -4-β-thiosulfatoethylsulfone, 1-amino-4-methylbenzene-3-β-thiosulfatoethylsulfone, 1-amino-4-methoxybenzene-3-β-thiosulfatoethylsulfone, 1-aminobenzene-4-β-thiosulfatoethylsulfone-2-sulfonic acid, 1-aminobenzene-5-β-thiosulfatoethylsulfone-2-sulfonic acid, 1-aminobenzene-5-β-thiosulfatoethylsulfone-2,4-disulfonic acid, 1-amino-2,5-dimethoxy benzene-4-β-thiosulfatoethylsulfone, 1-aminobenzene-4-β-thiosulfatoethylsulfone-2-carboxylic acid, 1-aminobenzene-5-β-thiosulfatoethylsulfone-2-carboxylic acid, 1-amino-2-methoxybenzene-4-β-thiosulfatoethylsulfone, 1-amino-2-chlorobenzene-4-β-thiosulfatoethylsulfone, 1-amino-2-methoxybenzene-5-β-thiosulfatoethylsulfone, 2-aminonaphthalene-8-β-thiosulfatoethylsulfone, 2-aminonaphthalene-8-β-thiosulfatoethylsulfone-6-sulfonic acid, 1-amino-2-methoxy-5-methylbenzene-4-β-thiosulfatoethylsulfone, 2-aminonaphthalene-5- or -6-β-thiosulfatoethylsulfone-1-sulfonic acid, 2-aminonaphthalene-5- or -6-sulfatoethylsulfone and the like.

Of these, particularly preferred are 1-amino-4-methoxybenzene-3-β-sulfatoethylsulfone, 1-amino-2- methoxybenzene-5-β-sulfatoethylsulfone, and 2-aminonaphthalene-5- or -6-β-sulfatoethylsulfone-1-sulfonic acid. Much preferred are 1-amino-2-methoxybenzene-5-β-sulfatoethylsulfone and 2-aminonaphthalene-5- or -6-β-sulfatoethylsulfone-1-sulfonic acid.

Examples of the naphthalene compound of the formula (III) are 1-(2',4'-dichlorobenzoyl)-amino-8-hydroxynaphthalene-3,6- or -4,6-disulfonic acid, 1-(2',5'-dichlorobenzoyl)-amino-8-hydroxynaphthalene-3,6- or -4,6-disulfonic acid, 1-(2',4'-dinitrobenzoyl)-amino-8-hydroxynaphthalene-3,6- or -4,6-disulfonic acid, 1-(2'-methylbenzoyl)-amino-8-hydroxynaphthalene-3,6- or -4,6-disulfonic acid, 1-(4'-methylbenzoyl)-amino-8-hydroxynaphthalene-3,6- or -4,6-disulfonic acid, 1-(2'-nitrobenzoyl)-amino-8-hydroxynaphthalene-3,6- or -4,6-disulfonic acid, 1-(4'-nitrobenzoyl)-amino-8-hydroxynaphthalene-3,6- or -4,6-disulfonic acid, 1-(3'-nitrobenzoyl)-amino-8-hydroxynaphthalene-3,6- or -4,6-disulfonic acid, 1-(3'-methylbenzoyl)-amino-8-hydroxynaphthalene-3,6- or -4,6-disulfonic acid, 1-(2'-chlorobenzoyl)-amino-8-hydroxynaphthalene-3,6- or -4,6-disulfonic acid, 1-(4'-chlorobenzoyl)-amino-8-hydroxynaphthalene-3,6- or -4,6-disulfonic acid, 1-(3'-chlorobenzoyl)-amino-8-hydroxynaphthalene-3,6- or -4,6-disulfonic acid, 1-(2'-carboxy- or sulfobenzoyl)-amino-8-hydroxynaphthalene-3,6- or -4,6-disulfonic acid, 1-(4'-carboxy- or sulfobenzoyl)-amino-8-hydroxynaphthalene-3,6- or -4,6-disulfonic acid, 1-(2', 4'-dicarboxy- or disulfobenzoyl)-amino-8-hydroxynaphthalene-3,6- or -4,6-disulfonic acid, 1-(3',4'- or 3',5'-dichlorobenzoyl)-amino-8-hydroxynaphthalene-3,6- or 4,6-disulfonic acid and the like.

Of these, preferred are 1-(2'-chlorobenzoyl)amino-8-hydroxynaphthalene-3,6- or -4,6-disulfonic acid, 1-(2'-methylbenzoyl)-amino-8-hydroxynaphthalene-3,6- or -4,6-disulfonic acid, 1-(4'-chlorobenzoyl)-amino-8-hydroxynaphthalene-3,6- or -4,6-disulfonic acid and 1-(2'-sulfobenzolyl)-amino-8-hydroxynaphthalene-3,6- or -4,6-disulfonic acid. Much preferred are 1-(2'-chlorobenzolyl)-amino-8-hydroxynaphthalene-3,6- or -4,6-disulfonic acid, 1-(4'-chlorobenzolyl)-amino-8-hydroxynaphthalene-3,6- or -4,6-disulfonic acid and 1-(2'-sulfobenzoyl)-amino-8-hydroxynaphthalene-3,6- or -4,6-disulfonic acid.

The monoazo compound (I) of the present invention is fiber-reactive and useful for dyeing or printing hydroxyl group-containing and amide group-containing materials in a fibrous form including unmixed or mixed fiber spinning.

The hydroxyl group-containing materials include natural or syntheric hydroxyl group-containing materials such as cellulose fiber materials, cellulose-containing fiber materials, regenerated products thereof and polyvinyl alcohol. Examples of the cellulose fiber materials are cotton and other vegetable fibers such as linen, hemp, jute and ramie fibers. Examples of the regenerated cellulose fibers are viscose staple and filament viscose. Examples of the cellulose-containing fiber materials are mixed fiber materials such as cellulose/polyester, cellulose/wool, cellulose/acryl and the like.

The amide group-containing materials include synthetic or natural polyamide and polyurethane. Examples of the materials, particularly in the fibrous forms, are wool and other animal furs, silk, leather, polyamide-6,6, polyamide-6, polyamide-11 and polyamide-4.

The dyeing may be carried out in a suitable manner, which can be selected from conventional manners depending on the physical and chemical properties of said fiber materials.

For example, cellulose fiber materials can be dyed using the present compound by an exhaustion dyeing, padding including cold batch-up dyeing or printing method.

The exhaustion dyeing can be carried out at a relatively low temperature in the presence of an acid binding agent such as sodium carbonate, trisodium phosphate, sodium hydroxide and the like, if desired using a neutral salt such as sodium sulfate, sodium chloride and the like.

The padding can be carried out by padding the fiber materials at ambient temperature or an elevated temperature, and after drying, steaming or dry-heating the materials to perform the dye-fixation.

The printing can be carried out by printing the fiber materials with a printing paste containing an acid binding agent such as sodium hydrogen carbonate, sodium carbonate, trisodium phosphate, sodium hydroxide and the like, urea and a paste such as sodium alginate, predrying the printed fiber materials and then steaming or dry-heating them at 100° to 200° C.

The dyeing of natural or synthetic polyamide and polyurethane fiber materials can be carried out by performing exhaustion in an acid or weak acid bath, while controlling the pH value, and then making the bath neutral, or in some cases alkaline to perform the fixation. The dyeing temperature ranges usually from 60° to 120° C.

The manoazo compound (I) of the present invention can be characterized in that it can exhibit excellent dye performances upon dyeing or printing the hydroxyl group- or amide group-containing fiber materials and high solubility in water, so that an aqueous liquid dye composition having a high storage stability over a long period of time can be readily prepared in a conventional manner. The present compound is particularly useful for the dyeing or printing of cellulose fiber, and the dyed or printed products have a high color yield with excellent even dyeing properties as well as excellent fastness properties such as chlorine fastness, light fastness, perspiration-light fastness and complex fastness properties including wet resistance-detergent resistance-light resistance and the like.

The present invention is illustrated in more detail with reference to the following Examples, which are only illustrative, but not limitative for the scope of the present invention. In Examples, all parts are by weight.

EXAMPLE 1

A mixture of 1-amino-8-hydroxynaphthalene-4,6-disulfonic acid (11 parts) and water (100 parts) was neutralized to form a clear solution, and o-sulfobenzoic acid anhydride (14 parts) in the form of powders was added to the clear solution little by little, while controlling the pH and the temperature within a range of 4 to 6 and 40° to 50° C., respectively. The mixture was stirred at this pH and at this temperature, until the 1-amino-8-hydroxynaphthalene-4,6-disulfonic acid disappeared. The reaction mixture was additionally stirred at a pH of 8 to 12 and at a temperature of 80° to 100° C. to perform the hydrolysis of O-acyl group.

On the other hand, 1-amino-2-methoxybenzene-5-β-sulfatoethylsulfone (9.4 parts) was diazotized in a conventional manner, and the resulting diazonium solution was added to the above reaction solution. The mixture was stirred at a pH of 5 to 7 and at a temperature of 0° to 5° C. to perform the coupling reaction. Thereafter, potassium chloride was added thereto, and the precipitate was collected on a filter and air-dried to obtain a monoazo compound of the following formula (1) in a free acid form.

fatoethylsulfone, thereby obtaining a monoazo compound of the following formula (2) in a free acid form.

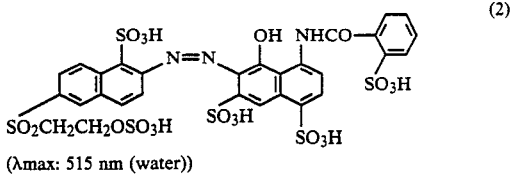

(λmax: 515 nm (water))

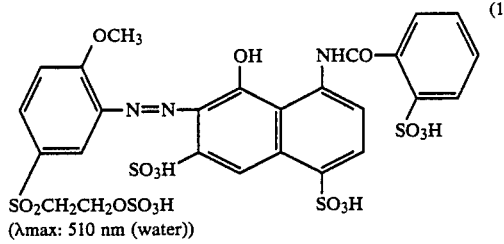

(λmax: 510 nm (water))

EXAMPLE 2

Example 1 was repeated, provided that 2-aminonaphthalene-6-β-sulfatoethylsulfone-1-sulfonic acid was used in place of 1-amino-2-methoxybenzene-5-β-sul-

EXAMPLE 3

Using the diazo component and the coupling component as shown in the following table in each free acid form, the corresponding monoazo compound characterized by the color on cellulose as shown also in the following table was obtained in a manner similar to that of Example 1.

| Run No. | Diazo component | Coupling component | Color on cellulose |
|---|---|---|---|
| 1 | NH₂-C₆H₄-SO₂CH₂CH₂OSO₃H | 8-OH, 1-NHCO-C₆H₄(SO₃H), naphthalene-3,6-disulfonic acid | Yellowish red |
| 2 | 3-NH₂-C₆H₄-SO₂CH₂CH₂OSO₃H | " | " |
| 3 | 2-CH₃O, 5-SO₂CH₂CH₂OSO₃H-aniline | " | Bluish red |
| 4 | 4-OCH₃, 3-SO₂CH₂CH₂OSO₃H-aniline | " | " |
| 5 | 2-amino-1-SO₃H-6-SO₂CH₂CH₂OSO₃H-naphthalene | " | " |
| 6 | 3-amino-8-SO₃H-6-SO₂CH₂CH₂OSO₃H-naphthalene | 8-OH, 1-NHCO-C₆H₄(SO₃H)-naphthalene-3,6-disulfonic acid | Bluish red |

-continued

| Run No. | Diazo component | Coupling component | Color on cellulose |
|---|---|---|---|
| 7 | 2-amino-8-(β-sulfatoethylsulfonyl)naphthalene | " | " |
| 8 | 4-(β-sulfatoethylsulfonyl)aniline | 1-hydroxy-4-(2-sulfobenzoylamino)-6-sulfo-... naphthalene with SO₃H | Yellowish red |
| 9 | 3-(β-sulfatoethylsulfonyl)aniline | " | " |
| 10 | 4-methoxy-3-(β-sulfatoethylsulfonyl)aniline | " | Red |
| 11 | 2-methoxy-5-methyl-4-(β-sulfatoethylsulfonyl)aniline | 1-hydroxy-4-(2-sulfobenzoylamino)-naphthalene-disulfonic acid | Bluish red |
| 12 | 2-amino-1-sulfo-6-(β-sulfatoethylsulfonyl)naphthalene | " | Red |
| 13 | 7-amino-3-sulfo-1-(β-sulfatoethylsulfonyl)naphthalene | " | " |
| 14 | 7-amino-1-(β-sulfatoethylsulfonyl)naphthalene | " | " |
| 15 | 2-methoxy-4-(vinylsulfonyl)aniline | " | " |

(Note: structures are drawn; textual descriptions above approximate the depicted chemical structures.)

Run 7: 2-amino naphthalene with SO₂CH₂CH₂OSO₃H at position 8.

Run 8: aniline with SO₂CH₂CH₂OSO₃H para to NH₂; coupling component: naphthalene bearing OH, NHCO-(2-sulfophenyl), and two SO₃H groups.

Run 9: aniline with SO₂CH₂CH₂OSO₃H meta to NH₂.

Run 10: aniline with NH₂, OCH₃, and SO₂CH₂CH₂OSO₃H.

Run 11: aniline with NH₂, OCH₃, CH₃, and SO₂CH₂CH₂OSO₃H substituents.

Run 12: naphthalene with SO₃H, NH₂, and SO₂CH₂CH₂OSO₃H.

Run 13: naphthalene with SO₂CH₂CH₂OSO₃H, NH₂, and SO₃H.

Run 14: naphthalene with SO₂CH₂CH₂OSO₃H and NH₂.

Run 15: aniline with CH₃O, NH₂, and SO₂CH=CH₂.

-continued

| Run No. | Diazo component | Coupling component | Color on cellulose |
|---|---|---|---|
| 16 | naphthalene with SO₃H, NH₂, SO₂CH=CH₂ substituents | naphthalene with OH, NHCO-phenyl(SO₃H), SO₃H, SO₃H substituents | Red |
| 17 | benzene with NH₂, CH₃O, SO₂CH=CH₂ | " | Bluish red |
| 18 | naphthalene with SO₃H, NH₂, SO₂CH=CH₂ | " | " |
| 19 | benzene with NH₂, SO₂CH₂CH₂Cl | naphthalene with OH, NHCO-phenyl(SO₃H), SO₃H, SO₃H | Yellowish red |
| 20 | naphthalene with NH₂, SO₂CH₂CH₂OSO₃H | naphthalene with OH, NHCO-phenyl(SO₃H), SO₃H, SO₃H | Bluish red |
| 21 | benzene with NH₂, SO₂CH₂CH₂S—SO₃H | naphthalene with OH, NHCO-phenyl(SO₃H), SO₃H, SO₃H | Yellowish red |
| 22 | benzene with NH₂, SO₂CH₂CH₂OPO₃H₂ | " | " |
| 23 | naphthalene with NH₂, SO₂CH₂CH₂OSO₃H | naphthalene with OH, NHCO-phenyl(SO₃H), SO₃H, SO₃H | Bluish red |

EXAMPLE 4

A mixture of 1-(2'-chlorobenzoyl)-amino-8-hydroxynaphthalene-3,6-disulfonic acid (60 parts) and water (450 parts) was neutralized to form a clear solution. To this solution was added a diazonium salt of 2- aminonaphthalene-6-β-sulfatoethyldulfone-1-sulfonic acid (52 parts) prepared in advance in a conventional manner, and the mixture was stirred at a pH of 5 to 7 and at a temperature of 0° to 5° C. to perform the coupling reaction. Thereafter, sodium chloride was added thereto, and the precipitate was collected on a filter and air-dried to obtain a monoazo compound of the following formula (3) in a free acid form.

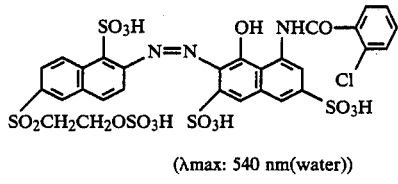

(3)

(λmax: 540 nm(water))

EXAMPLE 5

Example 4 was repeated, provided that 1-(4'-chlorobenzoyl)-amino-8-hydroxynaphthalene-3,6-disulfonic acid was used in place of 1-(2'-chlorobenzoyl)-amino-8-hydroxynaphthalene-3,6-disulfonic acid, thereby obtaining a monoazo compound of the following formula (4) in a free acid form.

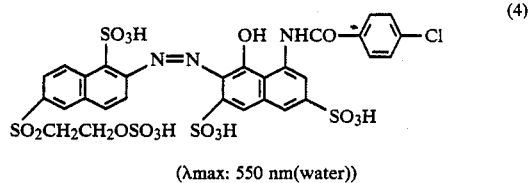

(4)

(λmax: 550 nm(water))

EXAMPLE 6

Using the diazo component and the coupling component as shown in the following table in each free acid form, the corresponding monoazo compound characterized by the color on cellulose as shown also in the following table was obtained in a manner similar to that of Example 4.

| Run No. | Diazo component | Coupling component | Color on cellulose |
|---|---|---|---|
| 1 | 2-amino-6-(β-sulfatoethylsulfonyl)naphthalene-1-sulfonic acid | 1-(2'-chlorobenzoyl)amino-8-hydroxynaphthalene-3,6-disulfonic acid | Yellowish red |
| 2 | " | 1-(2'-methylbenzoyl)amino-8-hydroxynaphthalene-3,6-disulfonic acid | Red |
| 3 | 2-amino-5-(β-sulfatoethylsulfonyl)naphthalene-1-sulfonic acid | 1-(4'-chlorobenzoyl)amino-8-hydroxynaphthalene-3,6-disulfonic acid | Bluish red |
| 4 | " | 1-(3',4'-dichlorobenzoyl)amino-8-hydroxynaphthalene-3,6-disulfonic acid | " |
| 5 | 2-amino-6-(β-sulfatoethylsulfonyl)naphthalene-1-sulfonic acid | 1-(4'-chlorobenzoyl)amino-8-hydroxynaphthalene-3,6-disulfonic acid | " |

-continued

| Run No. | Diazo component | Coupling component | Color on cellulose |
|---|---|---|---|
| 6 | 2-amino-1-naphthalenesulfonic acid with SO₂CH₂CH₂OSO₃H at 5-position | 4-hydroxy-8-(4-chlorobenzoylamino)naphthalene-2,6-disulfonic acid type (OH, NHCO-C₆H₄-Cl, SO₃H, SO₃H) | Red |
| 7 | 2-amino-1-naphthalenesulfonic acid with SO₂CH₂CH₂OSO₃H at 6-position | 4-hydroxy-8-(4-methylbenzoylamino)naphthalene-3,6-disulfonic acid (OH, NHCO-C₆H₄-CH₃, SO₃H, SO₃H) | Bluish red |
| 8 | " | analogous with NHCO-C₆H₄-Cl (3-Cl), OH, SO₃H, SO₃H | " |
| 9 | " | analogous with NHCO-C₆H₄-NO₂ (2-NO₂), OH, SO₃H, SO₃H | Red |
| 10 | 2-amino-1-naphthalenesulfonic acid with SO₂CH₂CH₂OSO₃H at 5-position | analogous with NHCO-C₆H₄-NO₂ (4-NO₂), OH, SO₃H, SO₃H | Bluish red |
| 11 | 2-amino-1-naphthalenesulfonic acid with SO₂CH₂CH₂OSO₃H at 6-position | 4-hydroxy-8-(4-chlorobenzoylamino)naphthalene-2,6-disulfonic acid (OH, NHCO-C₆H₄-Cl, SO₃H, SO₃H) | Bluish red |
| 12 | " | analogous with NHCO-C₆H₄-CH₃ (2-CH₃), OH, SO₃H, SO₃H | Yellowish red |

-continued
| Run No. | Diazo component | Coupling component | Color on cellulose |
|---|---|---|---|
| 13 | " | 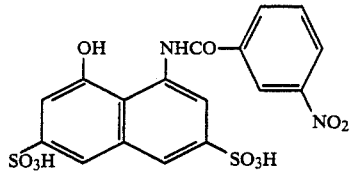 | Bluish red |
| 14 | " | 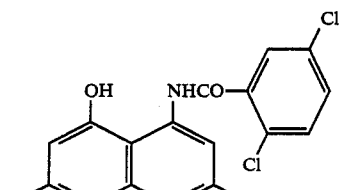 | " |
| 15 |  | 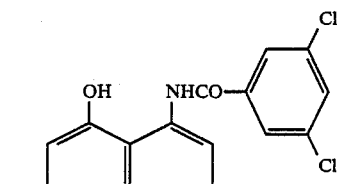 | " |
| 16 | 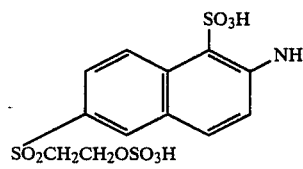 | 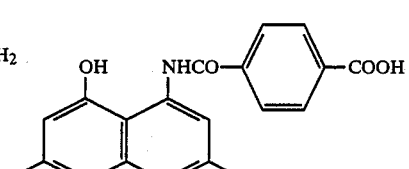 | Bluish red |
| 17 | " | 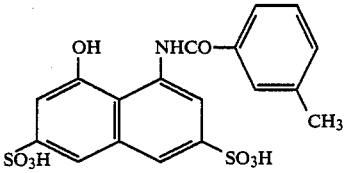 | " |
| 18 | 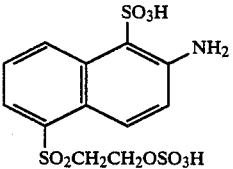 | 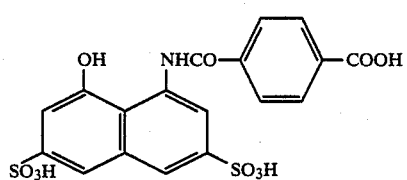 | " |
| 19 | 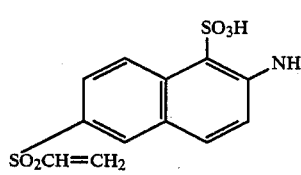 | 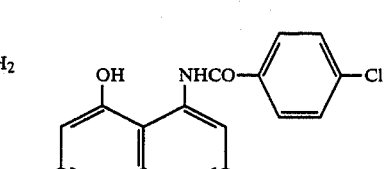 | " |
| 20 | " | 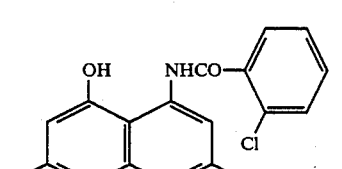 | Red |

| Run No. | Diazo component | Coupling component | Color on cellulose |
|---|---|---|---|
| 21 | naphthalene with SO₃H, NH₂, SO₂CH=CH₂ | naphthalene with OH, NHCO-(o-Cl-phenyl), SO₃H, SO₃H | Yellowish red |
| 22 | naphthalene with SO₃H, NH₂, SO₂CH₂CH₂Cl | naphthalene with OH, NHCO-(o-Cl-phenyl), SO₃H, SO₃H | Bluish red |
| 23 | naphthalene with SO₃H, NH₂, SO₂CH₂CH₂OSO₃H | naphthalene with OH, NHCO-(2,3-diCl-phenyl), SO₃H, SO₃H | " |

EXAMPLE 7

Each monoazo compound (0.3 part) obtained in Examples 1,2,4 and 5 was dissolved in water (200 parts), and sodium sulfate (10 parts) and cotton (10 parts) were added to the solution. The bath was heated to 50° C., and 20 minutes thereafter, sodium carbonate (4 parts) was added thereto.

Dyeing was continued for 1 hour at that temperature. The cotton was washed with water and soaped to obtain each dyed product of a deep red color excellent in fastness properties.

Using the monoazo compounds obtained in Examples 3 and 6, dyeing was carried out in a manner similar to that described above to obtain a result similar to that of the above.

EXAMPLE 8

Each monoazo compound (15 parts) obtained in Examples 1,2,4 and 5 was dissolved in hot water (200 parts) together with urea (50 parts). To this solution were added a paste (400 parts) prepared using sodium alginate (40 parts) and water (960 parts), and then sodium hydrogencarbonate (20 parts). The paste was added to the resulting mixture to make the whole 1000 parts.

Cotton cloth was printed with the printing paste obtained above, and the printed cloth was dried and then steamed for 5 minutes at 100° to 103° C., and thereafter rinsed with water and then hot water, boilsoaped, again rinsed and then dried to obtain each printed product of a deep red color excellent in fastness properties.

Each monoazo compound obtained in Examples 1 and 4 was formed into each aqueous liquid composition in a conventional manner. The composition was stored, and thereafter used for the printing in the same manner as above, then obtaining each printed product similar to that of the above.

Using each monoazo compound obtained in Examples 3 and 6, the printing was carried out in a manner similar to that described above, then obtaining each result similar to that of the above.

What is claimed is:

1. A monoazo compound represented by the following formula in a free acid form,

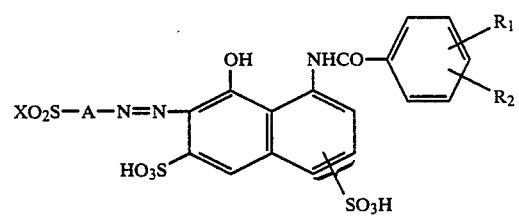

wherein A in phenylene unsubstituted or substituted with methyl, methoxy, chloro, carboxy or sulfo, or naphthylene unsubstituted or substituted with sulfo, $R_1$ and $R_2$ are independently hydrogen, chloro, methyl, nitro, carboxy or sulfo, provided that $R_1$ and $R_2$ cannot both be hydrogen and $R_1$ is sulfo located at o-position to —NHCO— and $R_2$ is hydrogen when A is phenylene, and X is —CH=CH₂ or —CH₂CH₂Y in which Y is a group splittable by the action of an alkali.

2. A monoazo compound represented by the following formula in a free acid form,

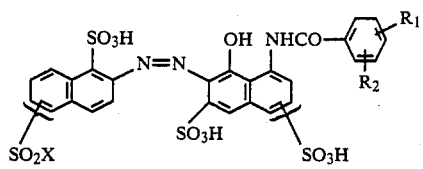

wherein $R_1$ and $R_2$ are independently hydrogen, chloro, methyl, nitro, carboxy or sulfo, excepting the case where both $R_1$ and $R_2$ are hydrogen, and X is —CH=CH$_2$ or —CH$_2$CH$_2$Y in which Y is a group splittable by the action of an alkali.

3. A monoazo compound represented by the following formula in a free acid form,

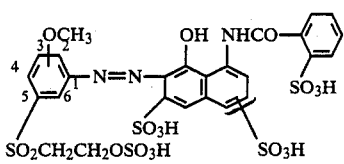

wherein the methoxy is located at 2- or 4-position.

4. A monoazo compound represented by the following formula in a free acid form,

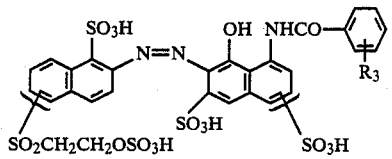

wherein $R_3$ is chloro, methyl, nitro, carboxy or sulfo.

5. A monoazo compound represented by the following formula in a free acid form,

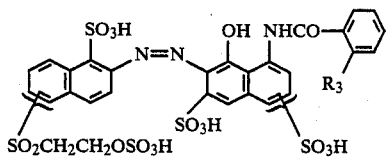

wherein $R_3$ is chloro, methyl, nitro, carboxy or sulfo.

6. A monoazo compound represented by the following formula in a free acid form,

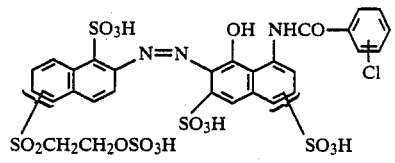

7. A monoazo compound represented by the following formula in a free acid form,

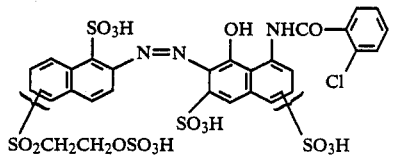

8. A monoazo compound represented by the following formula in a free acid form,

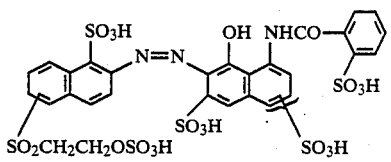

9. An aqueous liquid composition comprising a monoazo compound represented by the following formula in a free acid form,

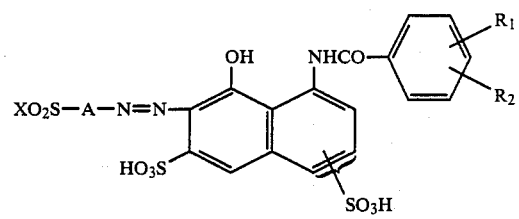

wherein A is phenylene unsubstituted or substituted with methyl, methoxy, chloro, carboxy or sulfo, or naphthylene unsubstituted or substituted with sulfo, $R_1$ and $R_2$ are independently hydrogen, chloro, methyl, nitro, carboxy or sulfo, provided that $R_1$ and $R_2$ cannot both be hydrogen and $R_1$ is sulfo located at o-position to —NHCO— and $R_2$ is hydrogen when A is phenylene, and X is —CH=CH$_2$ or —CH$_2$CH$_2$Y in which Y is a group splittable by the action of an alkali.

* * * * *